(12) United States Patent
Lee

(10) Patent No.: US 6,788,351 B2
(45) Date of Patent: Sep. 7, 2004

(54) CIRCUIT AND METHOD FOR ADJUSTING WIDTH OF FLY-BACK PULSE IN VIDEO SIGNAL PROCESSING UNIT REALIZED IN ONE CHIP

(75) Inventor: Jae-hoon Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 397 days.

(21) Appl. No.: 09/935,362

(22) Filed: Aug. 22, 2001

(65) Prior Publication Data

US 2002/0044220 A1 Apr. 18, 2002

(30) Foreign Application Priority Data

Oct. 16, 2000 (KR) ........................................ 2000-60703

(51) Int. Cl.$^7$ ................................................ H04N 5/10
(52) U.S. Cl. ........................ 348/531; 348/540; 315/384
(58) Field of Search ................................ 348/531, 540, 348/521, 536, 511, 735, 194; 315/384, 385, 386; H04N 5/10; H03L 7/00

(56) References Cited

U.S. PATENT DOCUMENTS

| | | | |
|---|---|---|---|
| 4,767,971 A | 8/1988 | Onozawa et al. | 315/384 |
| 5,561,354 A | 10/1996 | Simons et al. | 315/408 |
| 5,714,849 A * | 2/1998 | Lee | 315/408 |
| 5,894,203 A * | 4/1999 | Lee | 315/387 |
| 5,917,292 A | 6/1999 | Marsanne | 315/384 |
| 5,932,977 A * | 8/1999 | Woo | 315/384 |
| 6,034,736 A | 3/2000 | Chen | 348/540 |
| 6,236,436 B1 * | 5/2001 | Muchenberger et al. | 348/540 |

FOREIGN PATENT DOCUMENTS

| | | | | |
|---|---|---|---|---|
| EP | 0528176 B1 | 1/1997 | | 3/233 |
| EP | 0503806 B1 | 6/1999 | | 1/577 |
| JP | 06197234 | 7/1994 | | H04N/3/24 |

* cited by examiner

Primary Examiner—Michael H. Lee
Assistant Examiner—Trang U. Tran
(74) Attorney, Agent, or Firm—Mills & Onello, LLP

(57) ABSTRACT

A fly-back pulse width adjustment circuit and a method for adjusting the width of a fly-back pulse which are applied to a video signal processing unit realized as one chip are provided. The fly-back pulse width adjustment circuit is built into a video signal processing unit including a video amplifier, an on screen display unit, and a horizontal/vertical synchronous signal processing unit within the video signal processing unit realized as one chip. Moreover the fly-back pulse width adjustment circuit includes a pulse shaping unit which shapes the fly-back pulse received from the outside via an input terminal and then applies the shaped fly-back pulse to the horizontal/vertical synchronous signal processing unit, and a pulse-width adjustment unit which adjusts the width of the shaped fly-back pulse in response to a predetermined control signal, generates the horizontal blank signal having a different occurrence time from the result of the adjustment in response to a selection signal, and applies the horizontal blank signal to the video amplifier and the on screen display unit. The fly-back pulse width adjustment circuit which is provided as external components of a chip is designed to have a simple structure, and consequently it is possible to build the fly-back pulse width adjustment circuit into a video signal processing unit realized as one chip. Moreover, the width of a fly-back pulse can be adjusted by control of a microcontroller or a microcomputer, thereby applying the fly-back pulse width adjustment circuit to various monitors. In addition, the fly-back pulse width adjustment circuit can input the fly-back pulse via one terminal without an external circuit. Therefore it is easy to manufacture a printed circuit substrate with use of the fly-back pulse width adjustment circuit.

9 Claims, 5 Drawing Sheets

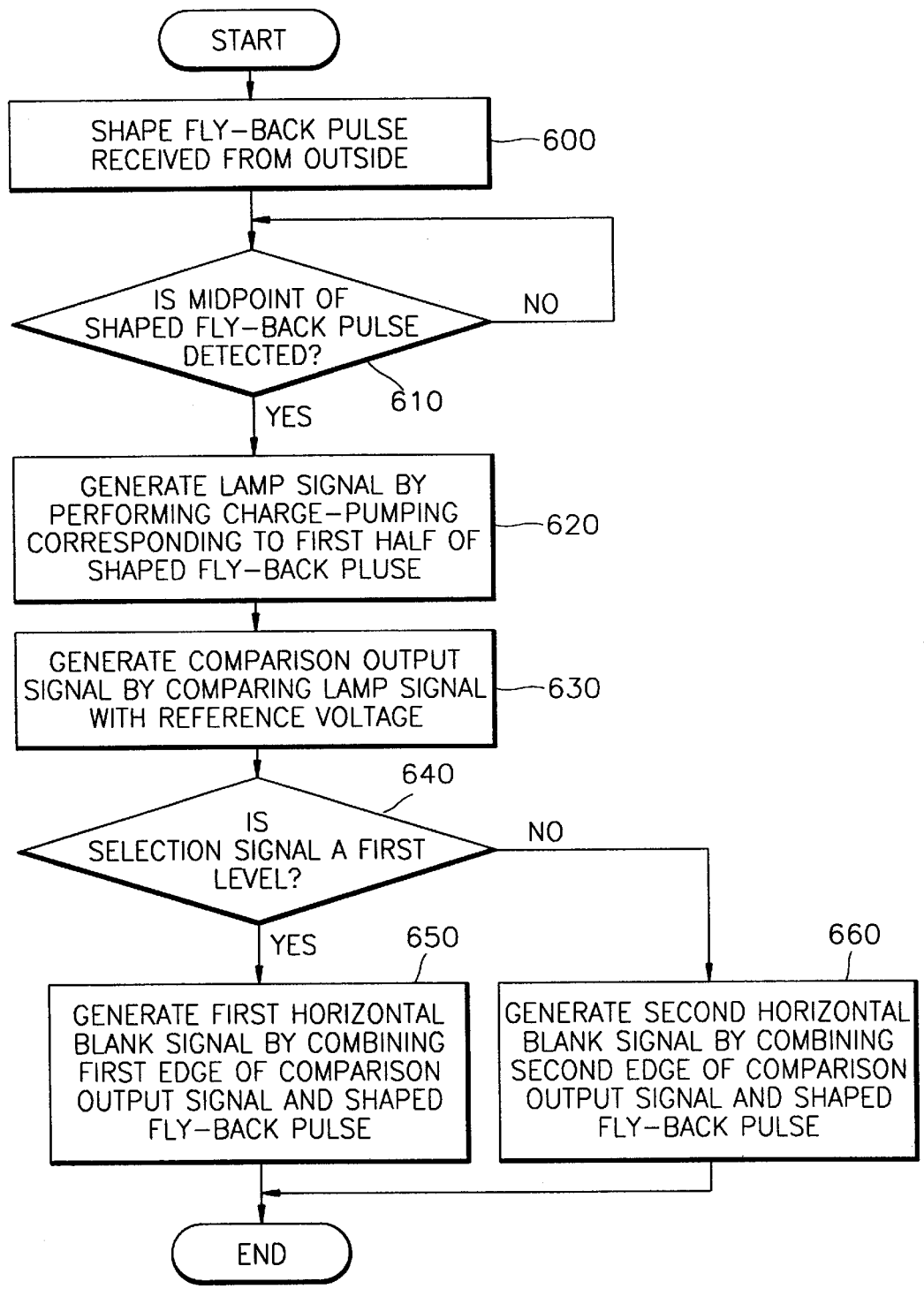

CIRCUIT AND METHOD FOR ADJUSTING WIDTH OF FLY-BACK PULSE IN VIDEO SIGNAL PROCESSING UNIT REALIZED IN ONE CHIP

BACKGROUND OF THE INVENTION

1. Field of the Invention

The present invention relates to a video signal processing unit used for a monitor, and more particularly, to a circuit and method for adjusting the width of a fly-back pulse, the apparatus and method being applied to a video signal processing unit realized in one chip.

2. Description of the Related Art

In general, a horizontal blank signal used for the purpose of blocking an electron beam during a horizontal retrace period of a monitor system is generated by receiving a fly-back pulse from an external horizontal deflection transformer. Conventionally, a video amplifier, an on-screen display (OSD) using a horizontal blank signal, and a horizontal/vertical synchronous signal processing unit using a fly-back pulse have been manufactured as separate chips.

FIG. 1 is a schematic block diagram illustrating a video signal processing unit where a conventional circuit for adjusting the width of a fly-back pulse is applied. The video signal processing unit includes a horizontal deflection transformer 10, a fly-back pulse width adjustment circuit 12, a video amplifier 14, an OSD unit 16, and a horizontal/vertical synchronous signal processing unit 18.

The fly-back pulse width adjustment circuit 12 illustrated in FIG. 1 receives a fly-back pulse (AFC) from the horizontal deflection transformer 10, adjusts the width of the fly-back pulse, and outputs the adjusted pulse as a horizontal blank signal (H_BLK). The pulse width of the horizontal blank signal must be adjusted to agree with a retrace period of a horizontal deflection yoke. In most cases, the fly-back pulse is applied after a predetermined time delay, and consequently, the fly-back pulse has a wider width as compared with a real horizontal retrace period. Therefore, a conventional video signal processing unit has used a fly-back pulse which is received from the fly-back pulse width adjustment circuit 12, the width of which is adjusted to properties of a monitor, as a horizontal blank signal. If the width of the horizontal blank signal is greater than the horizontal retrace period, the horizontal blank signal can invade a video signal region. On the contrary if the width is less than the horizontal retrace period, there may be interference in the video signal region caused by electron emission from an electron gun of a cathode ray tube (CRT). Therefore, the width of the blank signal must be adjusted appropriately.

FIG. 2 is a detail circuit diagram illustrating the fly-back pulse width adjustment circuit 12 illustrated in FIG. 1. In this figure, the fly-back pulse width adjustment circuit includes capacitors C21, C22, and C23, resistors R21, R22, and R23, a diode D21, and a transistor Q21.

With reference to FIG. 2, each of the capacitors C21, C22, and C23 has a very large capacity, because the fly-back pulse (AFC) is applied with a high voltage of several kilovolts. Accordingly the capacitors C21, C22, and C23 cannot be built as one chip and must be provided as external components. Moreover, in the case of the fly-back pulse width adjustment circuit 12 of FIG. 2, the capacitors C21, C22, and C23 and the resistors R21, R22, and R23 have been set to have fixed values, so that there is a disadvantage that the width of a pulse is fixed. Consequently, it is difficult to manufacture a printed circuit board (PCB) with use of the fly-back pulse width adjustment circuit 12 which is provided as external components, thereby causing an additional increase of the manufacturing cost. In addition, there is another disadvantage that the width of a fly-back pulse must be adjusted to accommodate properties of newly introduced monitors.

SUMMARY OF THE INVENTION

To solve the above problems, it is an object of the present invention to provide a circuit for adjusting the width of a fly-back pulse which is built into a video signal processing unit realized as one chip and which can adjust the width of a fly-back pulse easily.

It is another object of the present invention to provide a method for adjusting the width of a fly-back pulse which is performed in the fly-back pulse width adjustment circuit.

Accordingly, to achieve the first object of the invention, there is provided a circuit for adjusting the width of a fly-back pulse which is applied in a video signal processing unit realized in one chip according to the present invention. The fly-back pulse width adjustment circuit is built into a video signal processing unit including a video amplifier, and on-screen display, and a horizontal/vertical synchronous signal processing unit within the video signal processing unit realized as one chip. The fly-back pulse width adjustment circuit generates a horizontal blank signal by adjusting the width of an external fly-back pulse, and comprises a pulse standardization unit which shapes a fly-back pulse input from the outside via an input terminal and applies the shaped fly-back pulse to the horizontal/vertical synchronous signal processing unit. A pulse width adjustment unit adjusts the width of the shaped fly-back pulse in response to a predetermined control signal, generates a horizontal blank signal whose occurrence time can be varied from the result of the adjustment in response to a selection signal into a horizontal blank signal occurring at a different time, and then applies the horizontal blank signal to the video amplifier and the on-screen display unit.

To achieve the second object of the invention, there is provided a method of adjusting the width of a pulse which is applied to the video signal processing unit realized as one chip according to the present invention. Preferably, the method of adjusting the width of a pulse adjusts the width of an external fly-back pulse and subsequently generates a horizontal blank signal within the video signal processing unit where a video amplifier, an on-screen display unit and horizontal/vertical synchronous processing unit have been realized as one chip. The method of adjusting the width of a fly-back pulse includes the steps of shaping the fly-back pulse received from the outside, determining whether a mid-point of the shaped fly-back pulse is detected, generating a lamp signal by charge pumping performed corresponding to a section of the fly-back pulse if the mid-point of the shaped fly-back pulse is detected, comparing the lamp signal with a predetermined reference voltage, thereby generating an output signal from the result of the comparison, and combining the comparison output signal and the shaped fly-back pulse, thereby generating a horizontal blank signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a flow chart illustrating a method of adjusting the width of a fly-back pulse which is performed in the fly-back pulse width adjustment circuit illustrated in FIG. 4.

DETAILED DESCRIPTION OF THE PREFERRED EMBODIMENTS

Hereinafter, a circuit and a method for adjusting the width of a fly-back pulse which are applied to a video signal processing unit realized in one chip according to the present invention will be described with reference to attached drawings.

Figure 1:
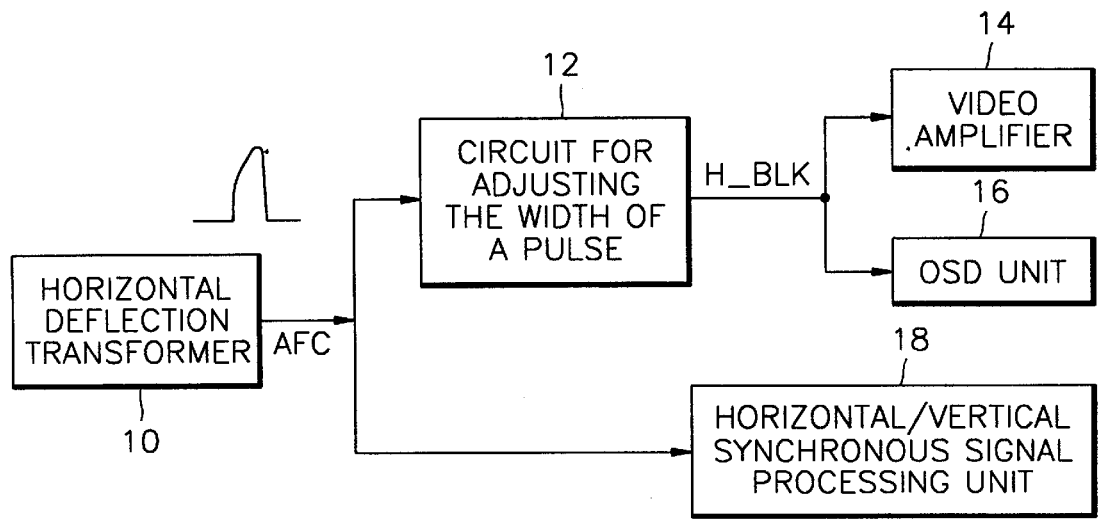
FIG. 1 is a schematic block diagram illustrating a video signal processing unit where a conventional fly-back pulse width adjustment circuit is applied.
Figure 2:
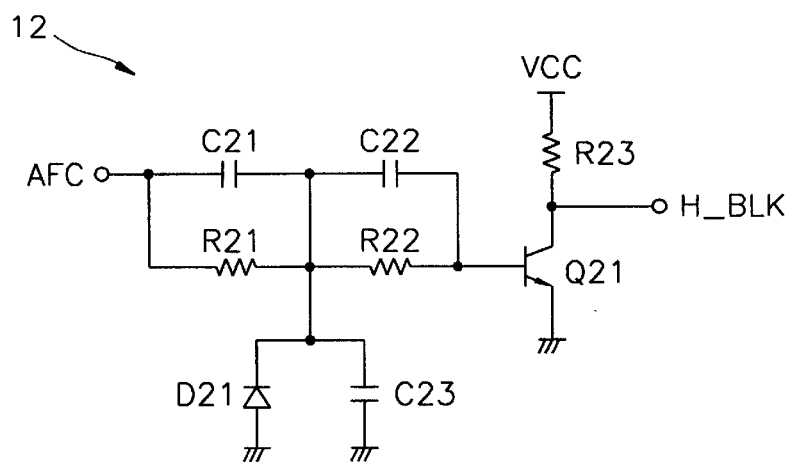
FIG. 2 is a circuit diagram illustrating a conventional fly-back pulse width adjustment circuit.
Figure 3:
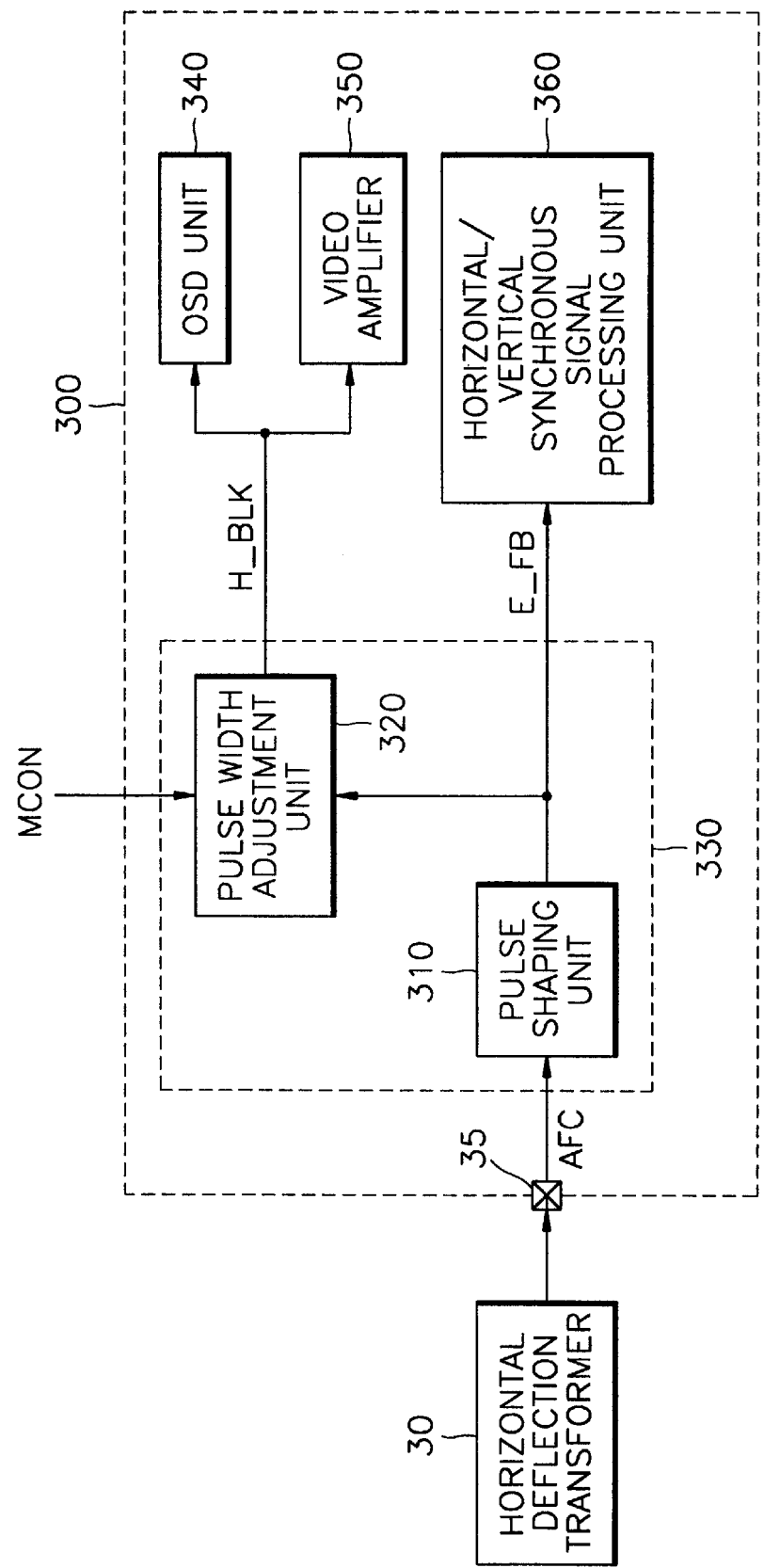
FIG. 3 is a block diagram illustrating a video signal processing unit realized as one chip, where a fly-back pulse width adjustment circuit according to the present invention is applied.

FIG. 3 is a block diagram showing an embodiment of the video signal processing unit realized as one chip where a fly-back pulse width adjustment circuit and a method for adjusting the width of a fly-back pulse is applied according to the present invention. Referring to FIG. 3, the video signal processing unit 300 realized in one chip includes an on-screen display (OSD) unit 340, a video amplifier 350, a horizontal/vertical synchronous signal processing unit 360, and the fly-back pulse width adjustment circuit 330.

The fly-back pulse width adjustment circuit 330 of FIG. 3 shapes a fly-back signal applied from an external horizontal deflection transformer 30, and then adjusts the width of the shaped fly-back pulse in response to a predetermined control signal MCON. The result of the adjustment is output as a horizontal blank signal (H_BLK). To output the horizontal blank signal, the fly-back pulse width adjustment circuit 330 includes a pulse shaping or standardization unit 310 and a pulse width adjustment unit 320. The pulse shaping unit 310 shapes the fly-back pulse (AFC) applied externally via an input terminal 35, and outputs the shaped fly-back pulse (E_FB) as a transistor—transistor logic (TTL) level signal. The pulse width adjustment unit 320 adjusts the width of the shaped fly-back pulse E_FB in response to a control signal MCON applied from an external controller (not shown). The pulse width adjustment unit 320 outputs the resultant signal as a horizontal blank signal H_BLK generated at a different time following the external controller (not shown). The structure and operation of the pulse width adjustment unit 320 will be described in detail later with reference to FIG. 4. Here, the controller (not shown) may be a microcontroller or a microcomputer.

The horizontal blank signal (H_BLK) generated from the fly-back pulse width adjustment unit 330 of FIG. 3 is applied to the OSD unit 340 and the video amplifier 350. Here, the OSD unit 340 displays text (or a symbol) and an image picture which are made to overlap each other on a screen. The video amplifier 350 amplifies an R/G/B color signal and controls the contrast and brightness of a video signal. That is, the OSD unit 340 and the video amplifier 350 prevent electron beams from being displayed on a monitor during a horizontal retrace period.

The shaped fly-back pulse (E_FB) generated from the fly-back pulse width adjustment circuit 330 is also applied to the horizontal/vertical synchronous signal processing unit 360. The horizontal/vertical synchronous signal processing unit 360 receives externally applied horizontal/vertical synchronous signals, and subsequently generates other horizontal/vertical synchronous signals which are appropriate for the range of frequency variation of a monitor. In addition, the horizontal/vertical synchronous signal processing unit 360 includes two phase-locked loops (PLL) (not shown), enabling it to generate horizontal/vertical synchronous signals having appropriate frequency and phases with use of the PLLs. At this time, the newly generated horizontal synchronous signals are applied to an external monitor and subsequently are input to one of the two PLLs by feedback. That is, the above shaped fly-back pulse (E_FB) becomes the feedback signals.

Figure 4:
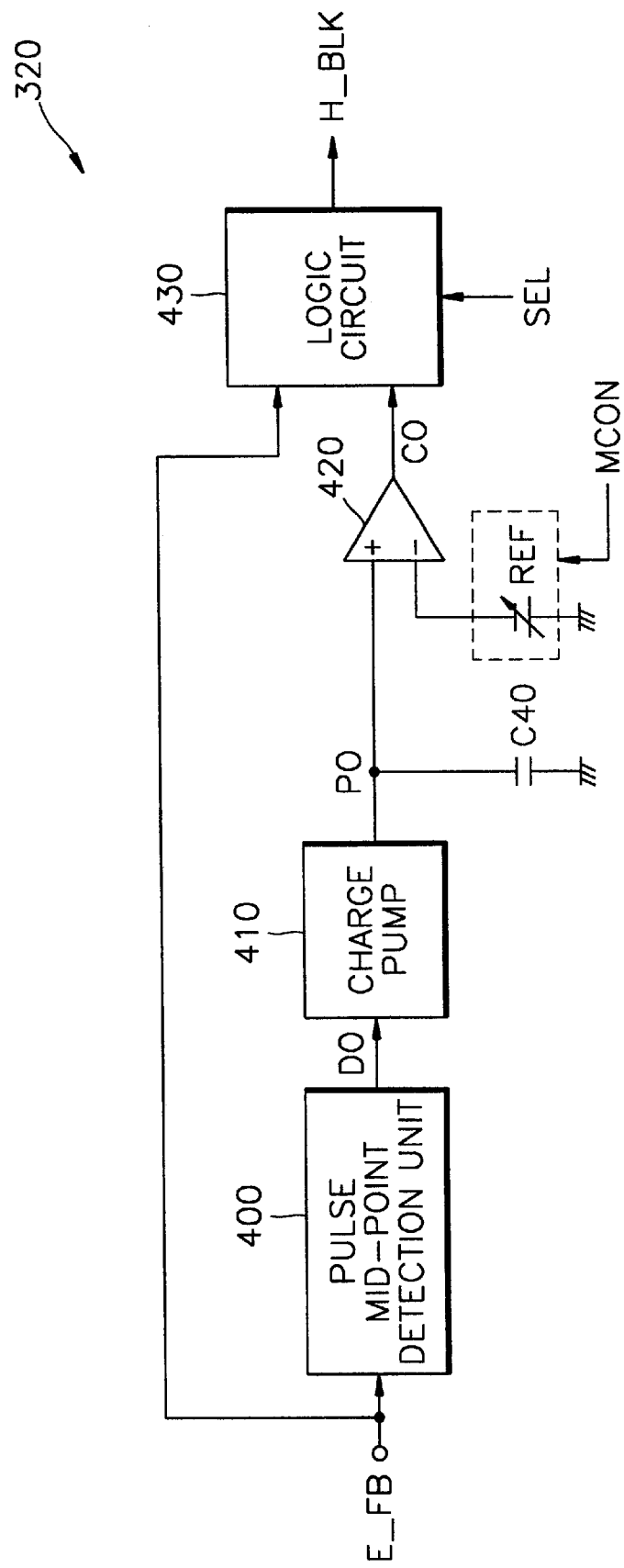
FIG. 4 is a circuit diagram illustrating a fly-back pulse width adjustment circuit according to an embodiment of the present invention.

FIG. 4 is a detailed circuit diagram illustrating one embodiment of the pulse width adjustment unit 320 within the fly-back pulse width adjustment circuit 330 illustrated in FIG. 3. The pulse width adjustment unit 320 includes a pulse mid-point detection unit 400, a charge pump 410, a capacitor C40, a comparator 420, and a logic circuit 430.

The pulse mid-point detection unit 400 receives the shaped fly-back pulse (E_FB) from the pulse shaping unit 310 and then detects its mid-point (M_P). Accordingly, the pulse mid-point detection unit 400 outputs only the first half of the pulse as a detection signal (DO) on the basis of the mid-point of the pulse.

The charge pump 410 performs charge-pumping in response to the detection signal (DO) and subsequently generates an output signal (PO). The charge pump 410 pumps up or pumps down a predetermined current in response to the detection signal (DO), and then the capacitor C40 is electrically charged or discharged by the pumping up current or the pumping down current. Consequently a lamp signal (PO) is generated by the charging or discharging of the capacitor.

The comparator 420 compares the lamp signal (PO) being applied via a positive input terminal with a reference voltage (REF) being applied via a negative input terminal, and generates a comparison output signal (CO) from the result of the comparison. The reference voltage (REF) can be varied by the control signal (MCON) originating from the controller (not shown) described above. The controller (not shown) sets the reference voltage (REF) according to the type and horizontal frequency of a monitor. In the realization of a circuit, the control signal (MCON) being applied from the controller (not shown) is converted into an analog current signal in a digital/analog converter (DAC). Therefore, the reference voltage (REF) corresponding to the converted current can be set. This reference voltage (REF) can be realized to have a value which has already been set by a designer on an external controller (not shown) in consideration of a monitor where the reference voltage is applied. In addition, the reference voltage (REF) appropriate for a monitor can be realized to be set automatically by the external controller (not shown).

The logic circuit 430 combines the shaped fly-back pulse signal (E_FB) and the comparison output signal (CO) being output from the comparator 420 logically, and the result of the logic combination is output as a horizontal blank signal (H_BLK) in response to a selection signal (SEL). Hence, the horizontal blank signal (H_BLK) being output via the logic circuit 430 can be obtained by adjusting the width of the shaped fly-back pulse appropriately. Here, the selection signal (SEL) is set to have a high level or a low level by the controller (not shown). Depending on whether the selection signal has a high level or a low level, the generation time of the horizontal blank signal can be varied. For example, if the selection signal has a high level, an output signal is set as a first horizontal blank signal (BLKH), and if the selection signal has a low level, an output signal is set as a second horizontal blank signal (BLKL).

Figure 5:
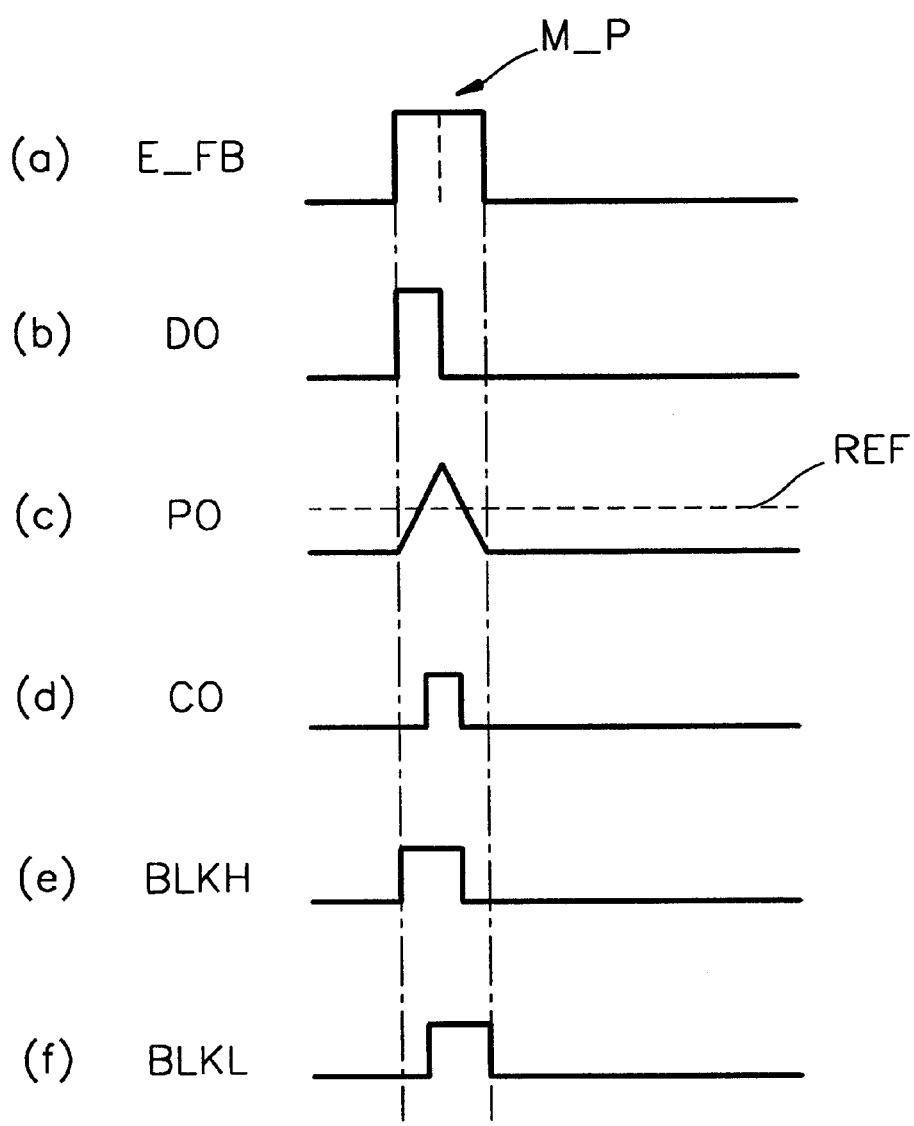
FIG. 5 contains waveform diagrams, labeled (a)–(f), illustrating the operations of the fly-back pulse width adjustment circuit illustrated in FIG. 4.

FIGS. 5A through 5G are waveform diagrams illustrating the operation of the fly-back pulse width adjustment circuit illustrated in FIG. 4. FIG. 5A indicates the shaped fly-back pulse (E_FB), FIG. 5B indicates the detection signal (DO) being output from the pulse mid-point detection unit 400, FIG. 5C indicates the lamp signal (PO) being output from the charge pump 410, and FIG. 5D indicates the output signal (CO) of the comparator 420. Finally, FIGS. 5E and 5F indicate the first horizontal blank signal (BLKH) and the second horizontal blank signal (BLKL), respectively.

FIG. 6 is a flow chart illustrating a method of adjusting the width of a fly-back pulse which is performed in the fly-back pulse width adjustment circuit illustrated in FIGS. 3 and 4.

With reference to FIGS. 3 through 6, the operation of the fly-back pulse-width adjustment circuit 330 and the method of adjusting the width of a fly-back pulse will be described in detail. In step 600 of FIG. 6, the pulse standardization or shaping unit 310 within the fly-back pulse-width adjustment circuit 330 shapes a fly-back pulse (AFC) being input from the outside, and then generates a signal of a TTL level. In step 610, it is determined whether a mid-point of the shaped fly-back pulse (E_FB) is detected. Referring to FIG. 5A, if the mid-point (M_P) of the shaped fly-back pulse is detected, the pulse mid-point detection unit 400 outputs the first half of the shaped fly-back pulse as a detection signal (DO) on the basis of the mid-point (M_P). As illustrated in FIG. 5B, the shaped fly-back pulse exhibits a high level from a rising edge to the mid-point (M_P), and it exhibits a low level after the mid-point. In step 620, the charge pump 410 performs charge-pumping in response to the detection signal (DO) and generates a lamp signal (PO) which has undergone the charge pumping. Referring to FIG. 5C, in the section where the detection signal (DO) remains at a high level, current sourcing occurs in the charge pump 410 and then the capacitor C40 is charged. In this case, a voltage level increases gradually to a mid-point. As illustrated in FIG. 5C, while the detection signal (DO) is at a low level, the capacitor C40 is discharged by current sinking performed by the charge pump 410. Consequenly, the voltage level of the lamp signal (PO) decreases gradually after the mid-point.

In step 630, the comparator 420 compares a reference voltage (REF) generated by a control signal (MCON) with the lamp signal (PO) and then generates a comparison output signal (CO) illustrated in FIG. 5D. In FIG. 5D, when the level of the lamp signal (PO) is higher than the reference voltage (REF), a high-level output signal is generated. On the contrary, when the level of the lamp signal (PO) is lower than the reference voltage, a low-level output signal is generated. After the comparison output signal (CO) is generated, the logic circuit 430 combines the shaped fly-back pulse (E_FB) and the comparison output signal (CO) logically and then generates a horizontal blank signal (H_BLK). In step 640, it is determined whether a selection signal (SEL) is a first level, e.g., a high level. In step 640, if the selection signal (SEL) is set at a high level, the logic circuit 430 detects a first edge, e.g., a falling edge, of the comparison output signal (CO). Then, in step 650 the logic circuit 430 combines the falling edge portion of the comparison output signal (CO) and the shaped fly-back pulse (E_FB) and generates a first horizontal blank signal (BLKH) illustrated in FIG. 5E. On the other hand, if the selection signal (SEL) is set at a low level, the logic circuit 430 detects a second edge, e.g., a rising edge, of the comparison output signal (CO). In step 660, the logic circuit 430 combines the rising edge portion of the comparison output signal (CO) and the shaped fly-back pulse (E_FB) and consequently generates a second horizontal blank signal (BLKL) illustrated in FIG. 5F.

Referring to FIG. 5E, the rising edge and the falling edge of the first horizontal blank signal (BLKH) are synchronous with the shaped fly-back pulse (E_FB) of FIG. 5A and the comparison output signal (CO) of FIG. 5D, respectively. Referring to FIG. 5F, the rising edge and the falling edge of the second horizontal blank signal (BLKL) are synchronous with the comparison output signal (CO) of FIG. 5D and the shaped fly-back pulse of FIG. 5A, respectively.

As described above, according to the present invention, the reference voltage (REF) and the selection signal (SEL) are set by the control signal (MCON) having been applied from an external controller (not shown). Consequently, there is an advantage that the width of a fly-back pulse can be readily adjusted. Here, the width of a fly-back pulse has a uniform value regardless of a horizontal frequency. Therefore, the adjustable range of the width of a fly-back pulse can be set on the basis of time. In general, the width of a fly-back pulse is about 2–3 $\mu$s. Therefore, it is preferable that the adjustable range of the width of a fly-back pulse is set to be 0–1 $\mu$s.

According to the present invention, the fly-back pulse width adjustment circuit which is provided as an external component of a chip is designed to have a simple structure, and consequently it becomes possible that the fly-back pulse width adjustment circuit can be built into a video signal processing unit realized as one chip. Moreover, the width of a fly-back pulse can be adjusted by controls of a microcontroller or a microcomputer, thereby applying this circuit for adjusting the width of a fly-back pulse to various monitors. In addition, this circuit can input the fly-back pulse via one terminal without an external circuit. Therefore, it is easy to manufacture a printed circuit board with use of the fly-back pulse width adjustment circuit of the present invention.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A fly-back pulse width adjustment circuit which is provided within a video signal processing unit in which a video amplifier, an on screen display unit, and a horizontal/vertical synchronous processing unit are realized as one chip, the fly-back pulse width adjustment circuit comprising:

a pulse standardization unit which shapes the fly-back pulse received from the outside via an input terminal and then applies the shaped fly-back pulse to the horizontal/vertical synchronous signal processing unit; and a pulse-width adjustment unit which adjusts the width of the shaped fly-back pulse in response to a predetermined control signal, generates a horizontal blank signal whose generation time can be varied from the result of the adjustment in response to a selection signal, and applies the horizontal blank signal to the video amplifier and the on screen display unit, wherein the pulse-width adjustment unit comprises:

- a pulse mid-point detection unit which detects a mid-point of the shaped fly-back pulse and outputs a section of the pulse as a detection signal on the basis of the mid-point;
- a charge pump which selectively pumps up and pumps down a predetermined current in response to the detection signal, and then outputs the charge pumping results as a lamp signal;
- a comparator which compares the lamp signal with a reference voltage set by the control signal, and then generates a comparison output signal from the result of the comparison; and
- a logic circuit which combines the shaped fly-back pulse and the comparison output signal logically in response to the selection signal, and then outputs the result of the logic combination as the horizontal blank signal.

2. The fly-back pulse width adjustment circuit of claim 1, wherein the pulse mid-point detection unit outputs the first half of the shaped fly-back pulse as the detection signal on the basis of the mid-point of the pulse.

3. The fly-back pulse width adjustment circuit of claim 1, wherein the comparator converts the control signal applied from an external microcontroller into an analog signal, and then generates the reference voltage corresponding to the converted analog current value.

4. The fly-back pulse width adjustment circuit of claim 3, wherein the logic circuit (i) receives the selection signal according to controls of the microcontroller, (ii) generates a first horizontal blank signal by combining the shaped fly-back pulse and a falling edge of the comparison output signal, if the selection signal is a first level, and (iii) generates a second blank horizontal signal by combining the shaped fly-back pulse and a rising edge of the comparison output signal, if the selection signal is a second level.

5. A method of adjusting the width of a fly-back pulse for the purpose of generating a horizontal blank signal in a video signal processing unit in which a video amplifier, an on screen display unit, and a horizontal/vertical synchronous processing unit are realized as one chip, the method comprising the steps of:

(a) shaping the fly-back pulse received from the outside;
(b) determining whether a mid-point of the shaped fly-back pulse is detected;
(c) generating a lamp signal by performing charge pumping corresponding to a section of the fly-back pulse on the basis of the mid-point if the mid-point of the shaped fly-back pulse is detected;
(d) comparing the lamp signal with a predetermined reference voltage, thereby generating an output signal from the result of the comparison; and
(e) combining the comparison output signal and the shaped fly-back pulse, thereby generating the horizontal blank signal.

6. The method of adjusting the width of a fly-back pulse of claim 5, wherein in step (a), the fly-back pulse is shaped and converted into a signal of a transistor—transistor logic (TTL) level.

7. The method of adjusting the width of a fly-back pulse of claim 5, wherein step (c) is characterized by performing charge-pumping corresponding to the first half of the shaped fly-back pulse on the basis of the mid-point of the fly-back pulse.

8. The method of adjusting the width of a fly-back pulse of claim 5, wherein in step (d), the control signal applied from an external microcontroller is converted into an analog signal, and then the reference voltage corresponding to the converted analog current value is generated.

9. The method of adjusting the width of a fly-back pulse of claim 5, wherein step (e) comprises:

(e1) determining whether a selection signal for selecting the horizontal blank signal is a first level or a second level;
(e2) if the selection signal is determined to be a first level, combining a first edge of the comparison output signal and the shaped fly-back pulse, thereby generating a first horizontal fly-back pulse;
(e3) if the selection signal is determined to be a second level, combining a second edge of the comparison output signal and the shaped fly-back pulse, thereby generating a second horizontal fly-back pulse.

* * * * *